(12) United States Patent
Brannen, Jr. et al.

(10) Patent No.: US 8,997,089 B2
(45) Date of Patent: Mar. 31, 2015

(54) COMPUTER SYSTEM AND A METHOD OF DEPLOYING AN APPLICATION IN A COMPUTER SYSTEM

(75) Inventors: Samuel Hugh Brannen, Jr., Meilen (CH); Adrian Mark Colyer, Southampton (GB); Rob Harrop, Southampton (GB); Glyn Normington, Southampton (GB); Andy Wilkinson, Southampton (GB)

(73) Assignee: Pivotal Software, Inc., Palo Alto, CA (US)

( * ) Notice: Subject to any disclaimer, the term of this patent is extended or adjusted under 35 U.S.C. 154(b) by 1363 days.

(21) Appl. No.: 12/400,885

(22) Filed: Mar. 10, 2009

(65) Prior Publication Data

US 2009/0276769 A1    Nov. 5, 2009

(30) Foreign Application Priority Data

Apr. 30, 2008  (GB) .................................. 0807867.7

(51) Int. Cl.
  *G06F 9/445* (2006.01)
(52) U.S. Cl.
  CPC ...................................... *G06F 8/61* (2013.01)
  USPC ............................ 717/174; 717/175; 717/177
(58) Field of Classification Search
  None
  See application file for complete search history.

(56) References Cited

U.S. PATENT DOCUMENTS

| | | | | |
|---|---|---|---|---|
| 6,093,215 A | * | 7/2000 | Buxton et al. ................. | 717/177 |
| 6,195,794 B1 | * | 2/2001 | Buxton ......................... | 717/177 |
| 6,349,408 B1 | * | 2/2002 | Smith ........................... | 717/174 |
| 6,606,744 B1 | * | 8/2003 | Mikurak ....................... | 717/174 |
| 6,631,521 B1 | * | 10/2003 | Curtis .......................... | 717/175 |
| 6,704,778 B1 | * | 3/2004 | Horman ....................... | 709/220 |

(Continued)

FOREIGN PATENT DOCUMENTS

EP         1426857 A1     6/2004

OTHER PUBLICATIONS

"Developing Web Applications for WebLogic Server" Oracle Corp. Feb. 28, 2003 , <http://docs.oracle.com/cd/E13222_01/wls/docs81/webapp/deployment.html> pp. 1-5.*

(Continued)

*Primary Examiner* — Thuy Dao
*Assistant Examiner* — Samuel Hayim
(74) *Attorney, Agent, or Firm* — Fish & Richardson P.C.

(57) ABSTRACT

A computer system has a runtime environment (e.g. Java) and a deployment system (e.g. a Spring framework layer) arranged to deploy an application into the runtime environment. The application comprises bundles (e.g. OSGi bundles or JSR modules) each with manifest metadata defining dependencies for the respective bundle. A deployment management unit refers to one or more personality specific deployers to determine which of the bundles have a specific personality from a predetermined set of personality types. The personality specific deployers transform the respective personality-specific bundles by inserting one or more additional dependencies into the metadata of the bundle according to their personality type. The deployment management unit applies one or more operations to all of the plurality of bundles, including installing each of the bundles ready for deployment and deploys those bundles not having a specific personality type. The personality specific deployers deploy the personality-specific bundles according to their respective personality types.

15 Claims, 9 Drawing Sheets

(56) References Cited

U.S. PATENT DOCUMENTS

| | | | |
|---|---|---|---|
| 6,983,460 B1* | 1/2006 | Goire et al. | 717/175 |
| 7,206,817 B2* | 4/2007 | Fanshier et al. | 709/208 |
| 7,444,629 B2* | 10/2008 | Chirakansakcharoen et al. | 717/177 |
| 7,509,658 B2* | 3/2009 | Goring et al. | 719/328 |
| 7,716,665 B2* | 5/2010 | Buehler et al. | 717/175 |
| 7,933,925 B2* | 4/2011 | Sreedhar | 707/786 |
| 8,402,460 B2* | 3/2013 | Moore et al. | 717/175 |
| 2002/0144256 A1* | 10/2002 | Budhiraja et al. | 717/174 |
| 2003/0192031 A1* | 10/2003 | Srinivasan et al. | 717/174 |
| 2004/0068713 A1* | 4/2004 | Yannakoyorgos et al. | 717/101 |
| 2004/0143830 A1* | 7/2004 | Gupton et al. | 717/174 |
| 2004/0177352 A1* | 9/2004 | Narayanaswamy et al. | 717/175 |
| 2004/0194059 A1* | 9/2004 | Akella et al. | 717/118 |
| 2004/0237082 A1* | 11/2004 | Alcazar et al. | 717/174 |
| 2004/0255291 A1* | 12/2004 | Sierer et al. | 717/174 |
| 2005/0108702 A1* | 5/2005 | Baker et al. | 717/168 |
| 2005/0172295 A1* | 8/2005 | Goring et al. | 719/310 |
| 2005/0223101 A1* | 10/2005 | Hayes, Jr. | 709/228 |
| 2005/0278718 A1* | 12/2005 | Griffith et al. | 717/175 |
| 2005/0283759 A1* | 12/2005 | Peteanu et al. | 717/120 |
| 2007/0198475 A1 | 8/2007 | Meduri et al. | |
| 2007/0288228 A1* | 12/2007 | Taillefer et al. | 703/28 |
| 2008/0046882 A1 | 2/2008 | Blackhouse | |
| 2008/0098099 A1* | 4/2008 | Khasnis et al. | 709/222 |
| 2008/0109876 A1* | 5/2008 | Hitomi et al. | 726/2 |
| 2009/0172657 A1* | 7/2009 | Makelainen et al. | 717/174 |

OTHER PUBLICATIONS

Elisa Bertino et al., "Deploying Wide-Area Applications Is a Snap", IEEE, 2007, <http://ieeexplore.ieee.org/stamp/stamp.jsp?tp=&arnumber=4120452> pp. 72-79.*

Ioana Manolescu et al., "Model-Driven Design and Deployment of Service-Enabled Web Applications", ACM, 2005, <http://delivery.acm.org/10.1145/1090000/1084773/p439-manolescu.pdf> pp. 1-41.*

Petr Hnetynka, "Component Model for Unified Deployment of Distributed Component-based Software", Charles University, 2004, <http://d3s.mff.cuni.cz/publications/download/Hnetynka-tr-2004-4.pdf>, pp. 1-13.*

Andre van der Hoek, "Configurable Software Architecture in Support of Configuration Management and Software Deployment", ACM, 1999, <http://ieeexplore.ieee.org/stamp/stamp.jsp?tp=&arnumber=841107>, pp. 1-2.*

Alan Dearle, "Software Deployment, Past, Present and Future", IEEE, 2007, <http://delivery.acm.org/10.1145/1260000/1254724/28290269.pdf>, pp. 1-16.*

European Search Report as mailed in Application No. 09158389.8-2211 on Sep. 17, 2009.

The OSGi Aliance: "OSGi Service Platform Core Specification (Release 4, Version 4.1)" Internet Disclosure, [Online] Apr. 2007, XP007909673 Retrieved from the Internet: URL: http://www.osgi.org/download/r4v41/r4.core.pdf> [retrieved on Sep. 3, 2009] Chapters 3 and 4.

* cited by examiner

COMPUTER SYSTEM AND A METHOD OF DEPLOYING AN APPLICATION IN A COMPUTER SYSTEM

RELATED APPLICATIONS

This application claims priority to United Kingdom patent application number GB0807867.7 filed on Apr. 30, 2008, the contents of which are incorporated herein by reference in their entirety.

BACKGROUND

1. Technical Field

The present invention relates in general to the field of computers and computer systems. More particularly, the present invention relates to a computer system adapted to deploy an application program. Also, the present invention relates to a method of deploying an application program in a computer system.

2. Description of the Related Art

In general, an application program is developed on a development computer system, and is then deployed on a host computer system where it will be run (executed). The deployment process turns the application into its final executable form, such as the creation of links between the application and any libraries upon which it relies. However, applications have become increasingly complex and are increasingly difficult to deploy. This leads to a very lengthy deployment process and/or to errors (e.g. crashes) in the execution of the host system. It is therefore desired to improve the stability and reliability of the system. Also, it is desired to reduce the significant workload which is involved in correctly deploying new applications onto the host system.

FIG. 1 is a schematic overview of an example computer network of the related art. Here, an application 1 is developed on a development system 4 and is then deployed on one or more host computer systems 2, using a deployment mechanism 3. The application 1 then runs on the host computer system 2 and, in this example, serves one or more individual end-user clients 5, either over a local network or via intermediaries such as a web server 6. The application 1 often will also communicate with various other back-end computers such as a set of database servers 7. FIG. 1 is only an illustrative example and many other specific network configurations will be apparent to those skilled in the art.

Application programs are often developed using object-oriented programming languages, such as the popular Java language developed by SUN MICROSYSTEMS. More recently, Java 2 Standard Edition (J2SE) and Java 2 Enterprise Edition (JEE or J2EE) have been developed to support a very broad range of applications from the smallest portable applets through to large-scale multilayer server applications such as complex controls for processes, manufacturing, production, logistics, and other commercial applications. Java relies upon a virtual machine which converts universal Java bytecode into binary instructions in the instruction set of the host computer system. Increasingly, applications are developed with the assistance of middleware such as the Spring framework (see www.sprinqframework.org) and are released as a collection of OSGi bundles (see www.osgi.org). Applications are configured using a variety of different techniques, in order to link to the other components of the increasingly complex and interconnected computer systems of the current art. For instance, an OSGi application configures imported packages using a JAR manifest, but the application may also be a web application which uses the Spring framework. Further, the Spring configuration may be provided in an XML file defining Spring beans. Thus, there is a real difficulty in deploying the application efficiently and correctly on the host computer system, such that the host system will execute the application safely and reliably, whilst taking account of these different various configuration mechanisms.

SUMMARY OF THE INVENTION

According to the present invention there is provided a computer system, a method and a computer-readable storage medium, as set forth in the appended claims. Other, optional, features of the invention will be apparent from the dependent claims and the description which follows.

The following is a summary of various aspects and advantages realizable according to embodiments of the invention. It is provided as an introduction to assist those skilled in the art to more rapidly assimilate the detailed design discussion that ensues and does not and is not intended in any way to limit the scope of the claims that are appended hereto.

The example embodiments of the present invention discussed herein concern the reliability and stability of a computing system. In particular, the exemplary embodiments of the present invention concern an improved deployment mechanism for deploying an application into a runtime environment of a host computer system.

In one example embodiment, a computer system has a runtime environment (e.g. Java) and a deployment system (e.g. in a Spring framework layer) arranged to deploy the application into the runtime environment. The application comprises bundles (e.g. OSGi bundles or JSR 277 modules) each with manifest metadata defining dependencies for the respective bundle. A deployment management unit comprises a personality determining unit arranged to determine whether each bundle is non-specific or has a specific personality type; an operator unit arranged to apply one or more operations to each of the plurality of bundles, including installing each of the bundles ready for deployment; and a generic deployment unit arranged to deploy each of the generic non-specific bundles into the runtime environment. Further, one or more personality specific deployers each comprise: a transformer unit arranged to transform the personality-specific bundles by inserting one or more additional dependencies into the metadata of the bundle according to their personality type (e.g. web, batch); and a specific deployment unit arranged to deploy each of the personality-specific bundles into the application runtime environment according to their personality type.

In one example embodiment, the operator unit is arranged to apply at least one operation to each of the plurality of bundles in a like manner, including both the personality-specific bundles and the generic bundles.

In one example embodiment, each of the transformer units only transforms those bundles having a particular personality type.

In one example embodiment, the operator unit is arranged to apply the one or more operations to the plurality of bundles to act upon both the metadata which was originally received in the bundles and also on the additional dependencies which were inserted into the metadata by the personality specific deployers.

In one example embodiment, each of the personality types relates to a predetermined programming model. In one example embodiment, the set of personality types include at least a web personality type, and the transformer unit related to the web personality type is arranged to add the additional dependencies to import one or more web-specific packages including one or more servlet interface packages. In another example embodiment, the set of personality types include at least a batch personality type and the transformer unit related to the batch personality type is arranged to add the additional dependencies to import one or more batch-specific packages.

In one example embodiment, the personality determining unit is arranged to query each of the personality-specific deployers to determine which of the personality-specific deployers is adapted to process a particular candidate bundle from the application.

In one example embodiment, each of the personality specific deployers is arranged to determine whether or not it is adapted to process the candidate bundle by analyzing the physical structure of the bundle. In one example embodiment, the personality specific deployer associated with a web type personality is arranged to determine web-type bundles by the physical presence of a "/WEB-INF" directory within the candidate bundle.

In one example embodiment, one or more of the bundles comprises an explicit metadata flag denoting the personality type of that bundle. In one example embodiment, web-type bundles are detected by an explicit metadata flag of the form "Platform-ModuleType: Web".

In one example embodiment, the runtime environment further comprises a bundle management layer and the operator unit is arranged to install each of bundles with respect to the bundle management layer, including satisfying the additional dependencies created in the metadata by the personality specific deployers.

In one example embodiment, the operator unit further comprises a scoping unit arranged to scope the metadata of each of the bundles to produce a set of bundles which are unique to the application. In one example embodiment, the scoping unit is arranged to add mandatory attributes to export and import statements in the metadata such that the export and import statements are restricted with reference to the application.

In one example embodiment, the operator unit further comprises a synthesiser unit comprising an extractor unit arranged to examine the metadata and extract export statements from the metadata, a converter unit arranged to convert each of the export statements into a corresponding import statement defining a respective exported package as an imported package, and a creator unit arranged to create an additional synthetic bundle comprising metadata and a class loader, insert the import statements into the metadata of the synthetic bundle, and add the synthetic bundle to the application. In one example embodiment, the synthesiser unit is further arranged to set a thread context class loader associated with the application in the runtime environment to delegate class loading to the class loader of the synthetic bundle and the class loader of the synthetic bundle is arranged to load each of the exported packages of the plurality of bundles as the imported packages from the synthetic bundle.

In one example embodiment, the present invention provides a method of deploying an application program into an application runtime environment of a computer system. The method includes receiving the application program divided into a plurality of bundles, each bundle comprising metadata relating to zero or more dependencies of the bundle; determining whether or not each of the plurality of bundles is a personality-specific bundle having a specific personality type from amongst a predetermined set of personality types; transforming each of the personality-specific bundles by inserting additional dependencies into the metadata of the bundle according to the personality type of the respective personality-specific bundle; applying one or more operations to all of the plurality of bundles, including installing each of the bundles ready for deployment; deploying each of the installed personality-specific bundles into the application runtime environment according to the respective personality of the personality-specific bundles; and deploying each of the remaining bundles not having a specific personality type into the application runtime environment.

In one example embodiment, the method further comprises the steps of: extracting export statements from the metadata; converting each of the export statements into a corresponding import statement; creating an additional synthetic bundle comprising metadata and a class loader, inserting the import statements into the metadata of the synthetic bundle and adding the synthetic bundle to the application program; and setting a thread context class loader of the runtime environment associated with a thread of the application program to delegate class loading to the class loader of the synthetic bundle.

In one example embodiment, a computer-readable storage medium is provided having recorded thereon instructions to form a deployment system which when implemented by a computer system deploys an application program into a runtime environment of the computer system, wherein the application program is divided into a plurality of bundles, each bundle comprising metadata relating to zero or more dependencies of the bundle. The medium includes code configured to determine whether or not each of the plurality of bundles is a personality-specific bundle having a specific personality type from amongst a predetermined set of personality types; code configured to transform each of the personality-specific bundles by inserting additional dependencies into the metadata of the bundle according to the personality type of the respective personality-specific bundle; code configured to apply one or more operations to all of the plurality of bundles, including installing each of the bundles ready for deployment; and code configured to deploy each of the bundles into the application runtime environment, including deploying the personality-specific bundles according to their respective personality.

In one example embodiment there is provided a computer-readable storage medium having recorded thereon instructions to form an application program executable in a runtime environment of a computer system, the medium comprising: code configured to provide a plurality of bundles comprising metadata including export statements defining exported packages; and an explicit metadata flag provided in the metadata of at least one of the bundles denoting a personality type of that bundle.

In one example embodiment the medium further comprises code configured to provide an additional synthetic bundle comprising metadata and a class loader, wherein the metadata of the synthetic bundle comprises import statements corresponding to each of the export statements, and code configured to set a thread context class loader of the runtime environment associated with a thread of the application program to delegate class loading to the class loader of the synthetic bundle.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be embodied in software, or as a combination of software and hardware. Here, the software is configured to reside on an addressable storage medium and is configured to execute on one or more processors. The medium may take any suitable structure including an optical medium such as CD or DVD, a magnetic medium such as tape, floppy disk, or hard disk, or a solid-state medium such as dynamic or static random access memories (DRAMs or SRAMs), erasable and programmable read-only memories (EPROMs), electrically erasable and programmable read-only memories (EEPROMs) and flash memories. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the exemplary embodiments have been described with reference to the components, modules and units discussed herein, such functional elements may be combined into fewer elements or separated into additional elements.

BRIEF DESCRIPTION OF THE DRAWINGS

For a better understanding of the invention, and to show how exemplary embodiments may be carried into effect, reference will now be made to the accompanying drawings in which.

DETAILED DESCRIPTION OF THE EXEMPLARY EMBODIMENTS

The exemplary embodiments of the present invention will be discussed in detail in relation to Java and Spring. However, the teachings, principles and techniques of the present invention are also applicable in other exemplary embodiments. For example, embodiments of the present invention are also applicable to other virtual machine environments and other middleware platforms, which will benefit from the teachings herein.

Figure 2:
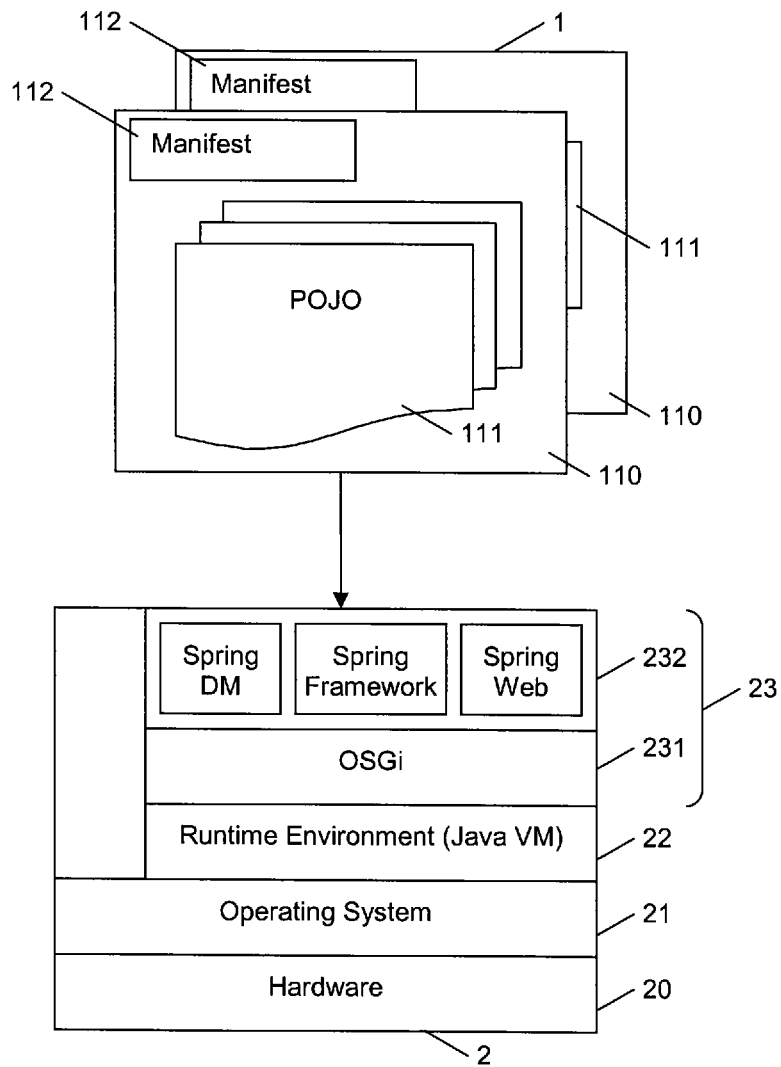
FIG. 2 is a schematic overview of a host computer system according to an exemplary embodiment of the present invention.

FIG. 2 is a schematic overview of a host computer system according to an exemplary embodiment of the present invention. In this example, the host computer system 2 includes hardware 20 such as processors, memory, I/O, network cards, etc., an operating system 21 such as WINDOWS, LINUX or SOLARIS, and a runtime environment 22 such as Java or MICROSOFT.NET. Further, the host computer 2 includes a middleware layer 23. This layer serves as an intermediary between the application program 1 and the underlying layers with their various different network technologies, machine architectures, operating systems and programming languages. In the illustrated example, the middleware layer 23 includes a bundle management layer 231 such as an OSGi layer that manages OSGi bundles (here, for further background information, see www.osgi.org). The middleware 23 also includes a framework layer 232, such as a Spring framework layer (see www.springframework.org) with associated components, such as a Spring Dynamic Module (Spring DM) which interfaces with the bundle management layer 231. In this example, the framework layer 232 further includes a Spring Web package which interfaces with a front-end application server environment or container such as Apache Tomcat, IBM WebSphere or BEA WebLogic, amongst others. These and other specific components of the framework layer will be apparent to those skilled in the art and need not be discussed here in detail.

The application 1 is conveniently formatted as a plurality of bundles 110. In general terms, a bundle is a packet, module or other subdivision comprising one or more portions of computer code (classes) which form part of an application program. Typically, the code in one bundle 110 will rely upon code in one or more other bundles 110 for proper execution of the application program 1. Thus, the bundles 110 are semi-independent collections of computer code but which are inter-dependent upon one another as part of a larger application. In this example, each of the bundles 110 comprises zero or more classes 111 which are grouped into one or more logically related packages, and a manifest 112 containing metadata (e.g. a standard JAR manifest or an XML-based file) concerning the classes 111 in that bundle 110. Conveniently, the Spring framework layer 232 allows the application to be based, in large part, on Plain Old Java Objects (POJOs). Those skilled in the art will appreciate that other equivalent terminologies will be appropriate in other specific implementations. For example, in the Java Enterprise Edition (JEE) environment, the bundles are instead termed "modules". In one exemplary embodiment, the bundles 110 are each modules compliant with JSR 277 (see www.jcp.org).

Typically, the application program 1 is released by the developer system with each bundle 110 in the form of a compressed Zip or JAR (Java archive) file ready to be deployed on the host computer system 2. Other examples include WAR (web archive) files and EAR (enterprise archive) files. The bundle management layer 231 manages installation and update of the bundles 110 in a bundle management environment (e.g. an OSGi environment) in a dynamic and scalable fashion. In particular, this bundle management layer 231 assists in managing the dependencies which are formed when classes are shared between bundles.

Figure 3:
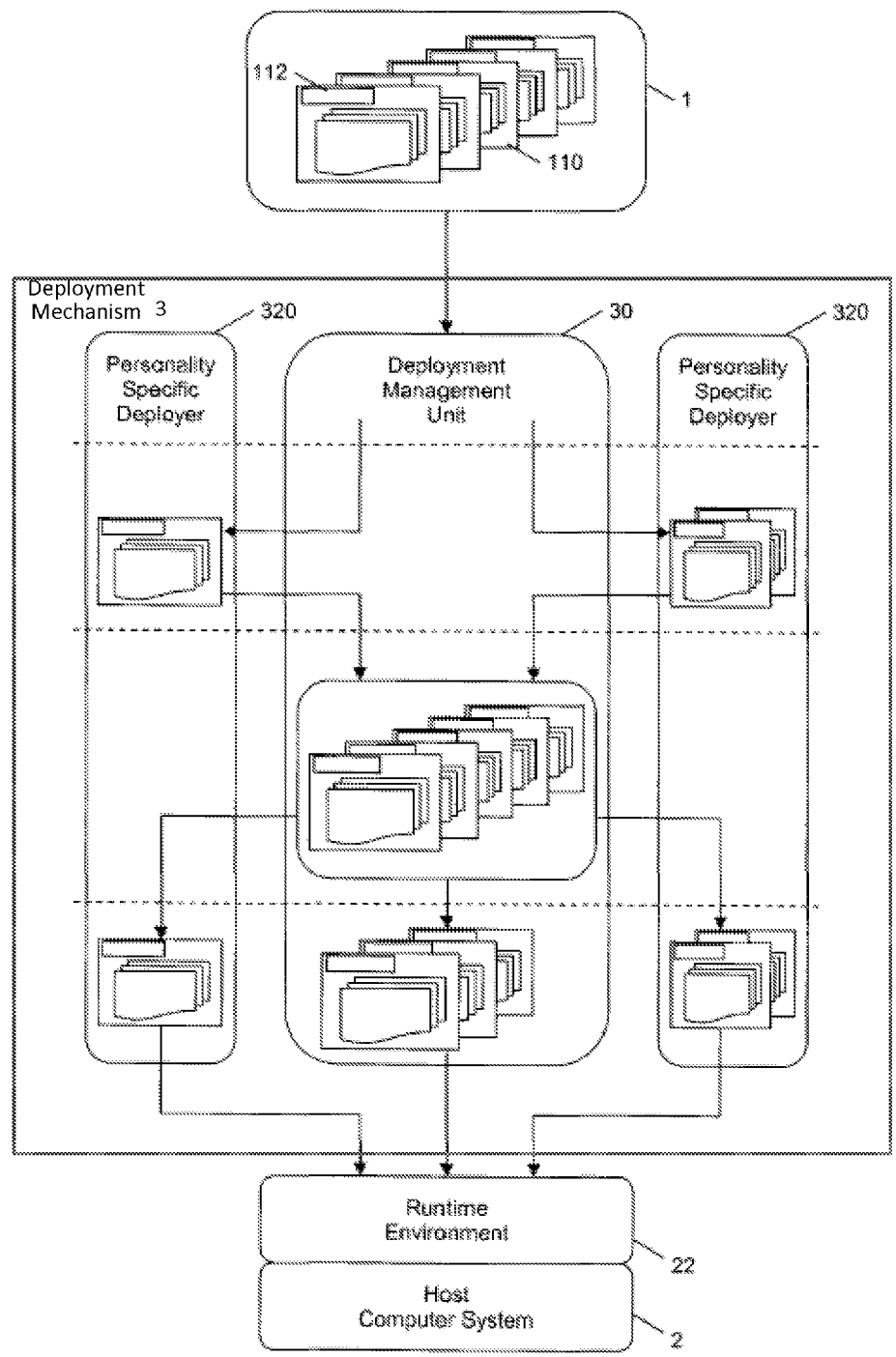
FIG. 3 is a schematic overview diagram of an exemplary deployment mechanism.

FIG. 3 is a schematic overview of an exemplary pipelined deployment mechanism. Here, a deployment mechanism 3 is arranged to deploy the application program 1 into the runtime environment 22 of the host computer system 2. The deployment mechanism 3 includes a deployment management unit 30 and a plurality of personality specific deployers 320. One or more bundles 110 in the application are determined to have a specific type of personality and are then processed according to the determined personality type. At some stage in the pipeline, the bundles are separated into streams for individual processing according to their personality, whilst other bundles not having a specific personality are not treated or are treated differently. Then, at some other stage in the pipeline, all of the bundles are treated together by a common process. This common process treats all of the bundles in a like manner, i.e. those bundles with specific personality types and the remainder not having specific personality are all treated equally. Thus, the pipeline is characterized by including at least one stage which is split by personality and at least one common stage. In FIG. 3, a transition between these various stages is illustrated by the horizontal dotted lines.

As illustrative examples, the set of personality types may include a web personality type and a batch personality type. The set may further include an Enterprise Service Bus personality type, a Service Oriented Architecture personality type, and a web services personality type. Generally, a personality relates to a commonly used programming model which has specific needs and requirements. For example, the web personality can infer a need to import web-specific packages such as servlet interface packages. By contrast, a bundle without any specific personality provides common utility classes which are not specific to a particular programming model.

In more detailed terms, the deployment management unit 30 manages the multiple personality-specific deployers 320, each of which is responsible for processing a particular type of bundle. In an initial phase, the deployment management unit 30 queries the set of managed personality-specific deployers 320 to determine which deployer 320 is adapted to process a particular candidate bundle or candidate bundles 110 from the application 1. A personality specific deployer 320 determines whether or not it will process a candidate bundle 110 by analyzing explicit metadata contained within the bundle, the physical structure of the bundle, or artifacts (clues) present in the bundle from which the bundle's type can be inferred. For example, web bundles may be detected by the physical presence of a "/WEB-INF" directory or by the presence of an explicit metadata flag such as "Platform-Module-Type: Web". If the personality-specific deployer 320 can process a candidate bundle, the deployment management unit 30 then delegates to that personality-specific deployer 320 during various stages of the deployment pipeline. During these various stages, the personality-specific deployer 320 processes the bundle's metadata and physical structure. If necessary, the deployer 320 will manipulate the metadata, files and directory structure, augment existing metadata with metadata necessary for the target runtime environment on the host computer system, generate artifacts based on the metadata, and transform each artifact into a format appropriate for the target environment.

Figure 4:
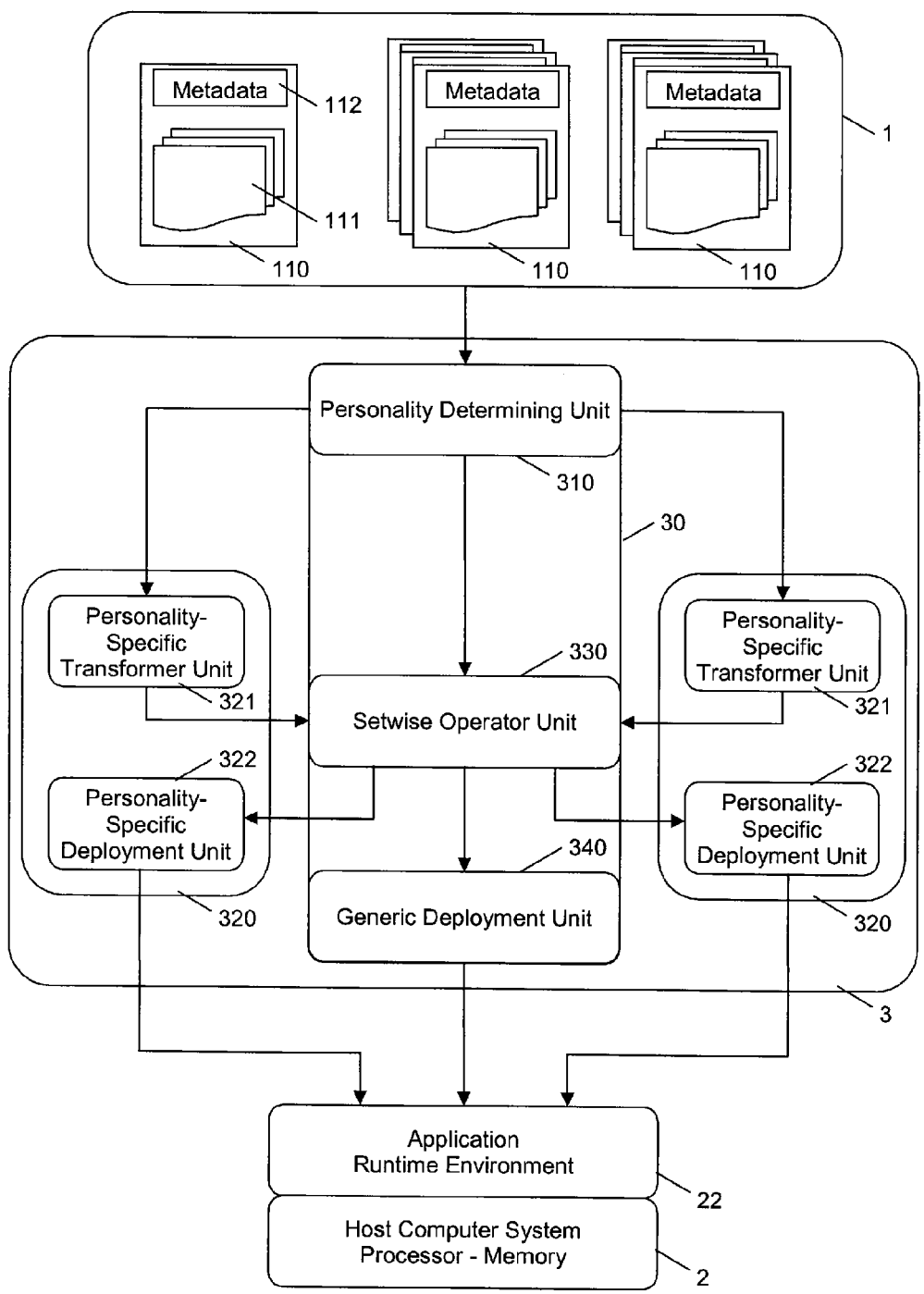
FIG. 4 is a schematic diagram showing selected parts of the exemplary host computer system related to deployment of the application program.

FIG. 4 is a schematic diagram showing selected parts of the host computer system in more detail.

As shown in FIG. 4, the deployment management unit 30 suitably comprises a personality determining unit 310, an operator unit 330 and a generic deployment unit 340. Further, the personality specific deployers 320 each comprise a personality specific transformer unit 321 and a personality specific deployment unit 322. Thus, in practical embodiments of the invention, a set of various different personality specific deployers 320 are provided giving a corresponding set of personality specific transformer units 321 and a corresponding set of personality specific deployment units 322.

The personality determining unit 310 is arranged to determine zero or more of the bundles 110 of this particular application 1 as having a personality selected from amongst a predetermined set of personality types, or else determine that this bundle is a generic bundle having no specific personality. Thus, the personality determining unit 310 determines, for each of the bundles 110 in the application 1, whether the respective bundle is a generic bundle or is a personality-specific bundle having a particular type of personality. In the exemplary embodiment, the personality determining unit 310 first performs an enquiry round with each of the personality specific deployers 320 by sending a request asking whether the deployer 320 can deploy the relevant bundle 110 and receiving a reply or replies. Where none of the deployers 320 indicates a capacity to deploy the bundle 110, then the personality determining unit determines that the bundle 110 is a generic bundle. When one of the deployers 320 does indicate such a capacity, then the personality of the bundle is determined accordingly. In the exemplary embodiments, each of the deployers 320 is associated with one corresponding personality type. Therefore, only exactly one of the deployers 320 should reply indicating capacity for a personality specific bundle, while two positive replies would indicate an error.

In the example embodiments, the deployers 320 use clues to infer personality of the bundle. In particular, each deployer 320 examines clues such as a file extension, an internal directory structure (e.g. the /WEB-INF directory), or the metadata 112. In most cases, the application 1 has been developed on a completely separate development system and thus it is necessary to infer the personality using the available clues. However, in other embodiments the development system is arranged to add an explicit marker such as a flag in the metadata 112 (e.g. "Platform-ModuleType: Web") which explicitly denotes the personality of the bundle. Here, the developer system 4 is adapted to mark bundles as being generic or having specific personalities.

When a bundle is determined as having a specific type of personality, then that bundle is supplied to the respective personality specific deployer 320 for further treatment. In particular, the personality specific transformer unit 321 is arranged to transform these bundles by inserting additional dependencies into the metadata 112 of the bundle 110 according to the type of personality of that bundle. Here, the transformer unit 321 is arranged to review the metadata 112 and selectively update this metadata to express dependencies which are necessary according to the relevant personality type but which are currently not explicitly defined in the metadata. For example, the transformer unit 321 may infer package imports and inject these into the JAR manifest metadata. Notably, in the example embodiment, the generic bundles not having a specific personality are not transformed.

The setwise operator unit 330 receives all of the bundles 110 in the application including the plain generic bundles and the personality specific bundles which have been transformed by the relevant transformer unit 321. The setwise operator unit 330 is arranged to apply one or more setwise operations to the plurality of bundles, and these setwise operations will be discussed in more detail below. These setwise operations act upon both the original metadata which was received with the bundles and also on the metadata, such as additional dependencies, which was injected by the personality specific deployers 320.

One of the setwise operations is to install each of the bundles 110 ready for deployment. For example, each of the bundles is an OSGi bundle and is installed with the OSGi layer 231.

The generic deployment unit 340 is arranged to deploy each of the generic bundles, as installed by the setwise operator unit 330, into the application runtime environment 22. Correspondingly, the personality specific bundles are deployed into the application runtime environment 22 by the respective personality specific deployment units 322.

Figure 5:
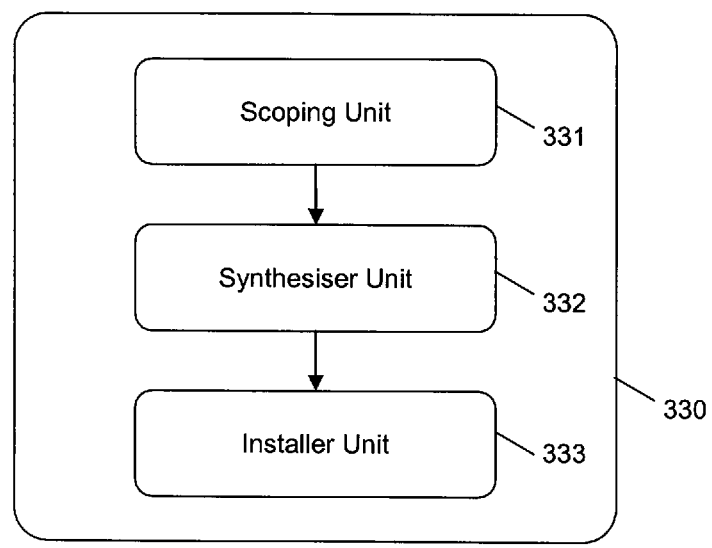
FIG. 5 is a schematic diagram showing further selected parts of the exemplary host computer system related to deployment of the application program.

FIG. 5 shows the setwise operator unit 330 in more detail. In this example embodiment, the setwise operator unit 330 comprises a scoping unit 331, a synthesiser unit 332 and an installer unit 333.

The scoping unit 331 is arranged to scope the application to produce a set of bundles which are unique to this application. For example, the scoping unit 331 is arranged to protect the name space of the application by adding mandatory attributes to exports and imports such that these exports and imports are unique to this application. Conveniently, the imports and exports are modified or restricted with reference to the application name or similar unique identifier. Thus, following this scoping operation, other applications will now not import the packages of this application. Optionally, the scoping unit 331 performs other setwise operations on the whole set of bundles, such as a validity check or a consistency check.

As an illustrative example, the original manifest for a particular bundle reads:
Manifest-Version: 1.0
Bundle-Name: RefreshExporter
Bundle-ManifestVersion: 2
Bundle-SymbolicName: RefreshExporter
Export-Package: refresh.exporter.b1
Bundle-Version: 1

This example metadata is scoped by the scoping unit 331 into:
Manifest-Version: 1.0
Bundle-Name: RefreshExporter
Platform-Scope: RefreshTest-1
Bundle-ManifestVersion: 2
Bundle-SymbolicName: RefreshTest-1-RefreshExporter
Export-Package: refresh.exporter.b1;
    platform_scope="RefreshTest-1";mandatory:="platform_scope"
Bundle-Version: 1

As another example, a manifest is received as follows:
Manifest-Version: 1.0
Bundle-Name: RefreshImporter
Import-Package: org.osgi.framework,
    com.springsource. platform.deployer.test,refresh.exporter.b1
Bundle-ManifestVersion: 2
Bundle-SymbolicName: RefreshImporter
Bundle-Version: 1.0.0

In this second example, the metadata is scoped to:
Manifest-Version: 1.0
Bundle-Name: RefreshImporter
Plafform-Scope: RefreshTest-1
Import-Package: org.osgi.framework,
    com.springsource. platform.deployer.test,
    refresh.exporter.b1;platform_scope="RefreshTest-1"
Bundle-ManifestVersion: 2
Bundle-SymbolicName: RefreshTest-1-RefreshImporter
Bundle-Version: 1.0.0

The installer unit 333 installs each of the bundles prior to final deployment. That is, the installer unit 333 performs an OSGi install and an OSGi start procedure in relation to the bundles. Installation includes resolution, which satisfies the application's dependencies—including satisfying those additional dependencies which are inserted or created in the metadata 112 by the personality specific deployers 320.

Figure 6:
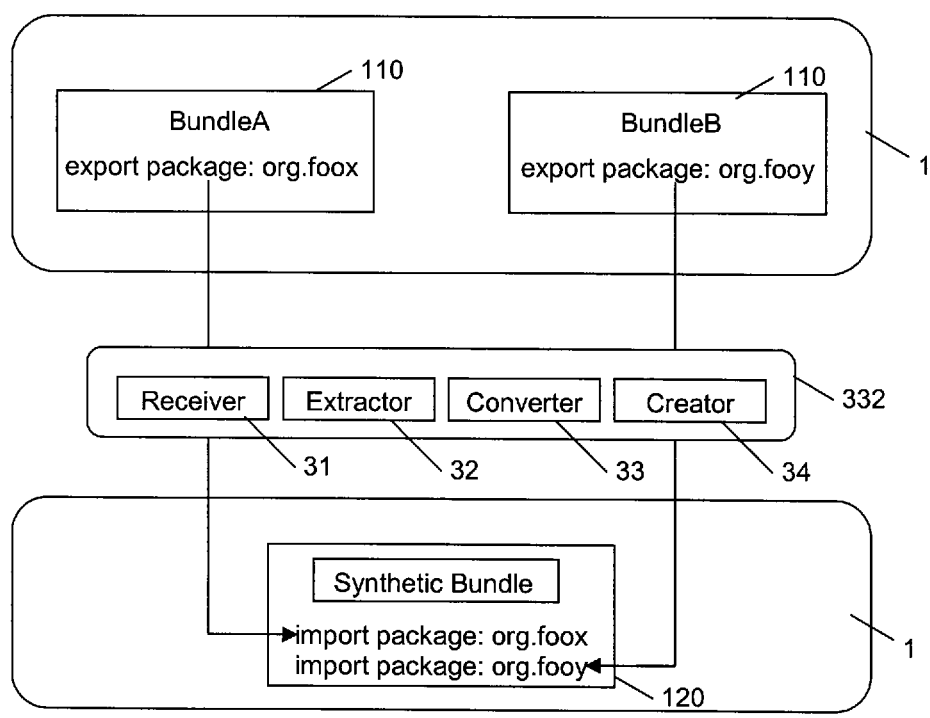
FIG. 6 is a schematic diagram showing further selected parts of the exemplary host computer system related to deployment of the application program.

FIG. 6 is a schematic diagram showing the synthesiser unit 332 in more detail.

The exemplary synthesiser unit 332 comprises a receiver unit 31, an extractor unit 32, a converter unit 33 and a creator unit 34.

Figure 1:
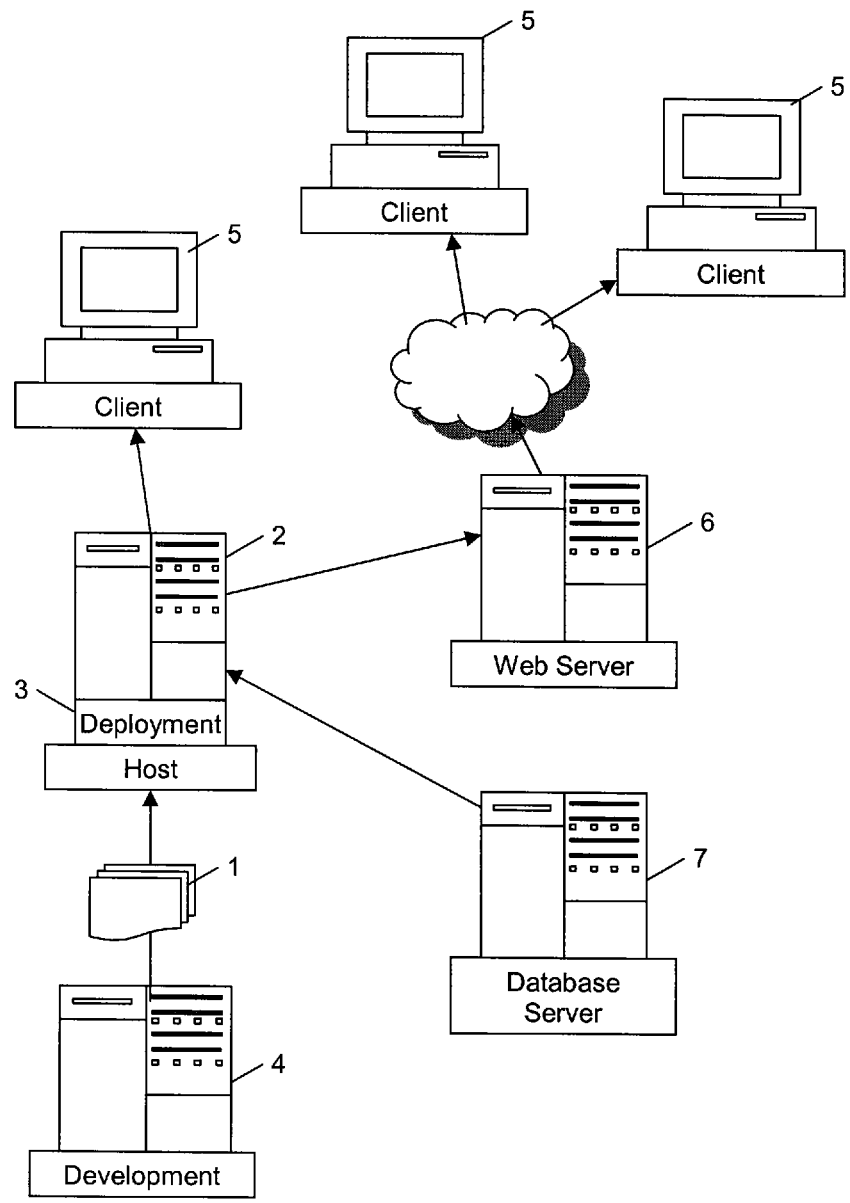
FIG. 1 is a schematic overview of an example computer network of the related art.

The receiver unit 31 receives the application program 1, which may well have been released by a separate and unrelated development system (see FIG. 1). The extractor unit 32 examines the metadata and extracts any and all export statements found therein. In this simplified illustrative example, BundleA exports the class package "org.foox", whilst BundleB exports the class package "org.fooy".

The converter unit 33 converts each of the identified exports into corresponding imports. The converter unit 33 optionally performs parameter conversion to convert one or more parameters of an extracted export into reformatted parameters of the corresponding import. For example, parameters in the export relating to version number (e.g. version=2.1) are converted into a version range (e.g. 2.1<=version<2.2) in the import. Similarly, a mandatory vendor name attribute (e.g. vendor=springsource/mandatory:=vendor) in the export is converted into a corresponding mandatory attribute in the import (e.g. vendor=springsource).

The creator unit 34 inserts these imports into a newly-created special synthetic bundle 120, and adds the synthetic bundle 120 to the application program 1. Here, in the example embodiments, the synthetic bundle 120 is an additional OSGi bundle.

As an illustrative example, consider an application named "RefreshTest-1". The application comprises one or more bundles 110 that export the class package "refresh.exporter.b1". Following the deployment mechanism discussed above, the synthetic bundle 120 (i.e. the additional bundle synthetic.context) is created having XML-based manifest metadata as reproduced below:
Manifest-Version: 1.0
Platform-Scope: RefreshTest-1
Import-Package: refresh.exporter.b1
Bundle-ManifestVersion: 2
Bundle-SymbolicName: RefreshTest-synthetic.context
Bundle-Version: 1

In the example embodiments, the extractor unit 32 also functions as a reporter unit configured to generate reports concerning errors encountered during this deployment process. Optionally, the error reports are delivered to a user interface of the host computer system 2. Also, in the exemplary embodiments, the error reports are optionally transmitted from the host computer system 2 to the developer system 1 as feedback concerning this live deployment of the application 1.

In one example embodiment, the extractor unit 32 is configured to report an error upon detecting two or more exports that refer to the same package name, thus detecting unintended split packages within the exported class space of the application. For example, consider the situation where BundleA exports "org,foox.x" and BundleB exports "org.foox.y", such that the class package is split between these two bundles. Here, the creator unit 34 prevents an attempt to export a split package in the synthetic bundle 120.

In another example embodiment, the extractor unit 32 is arranged to detect duplicate classes having the same name and thus protects the class name space in the exported packages of the application.

Figure 7:
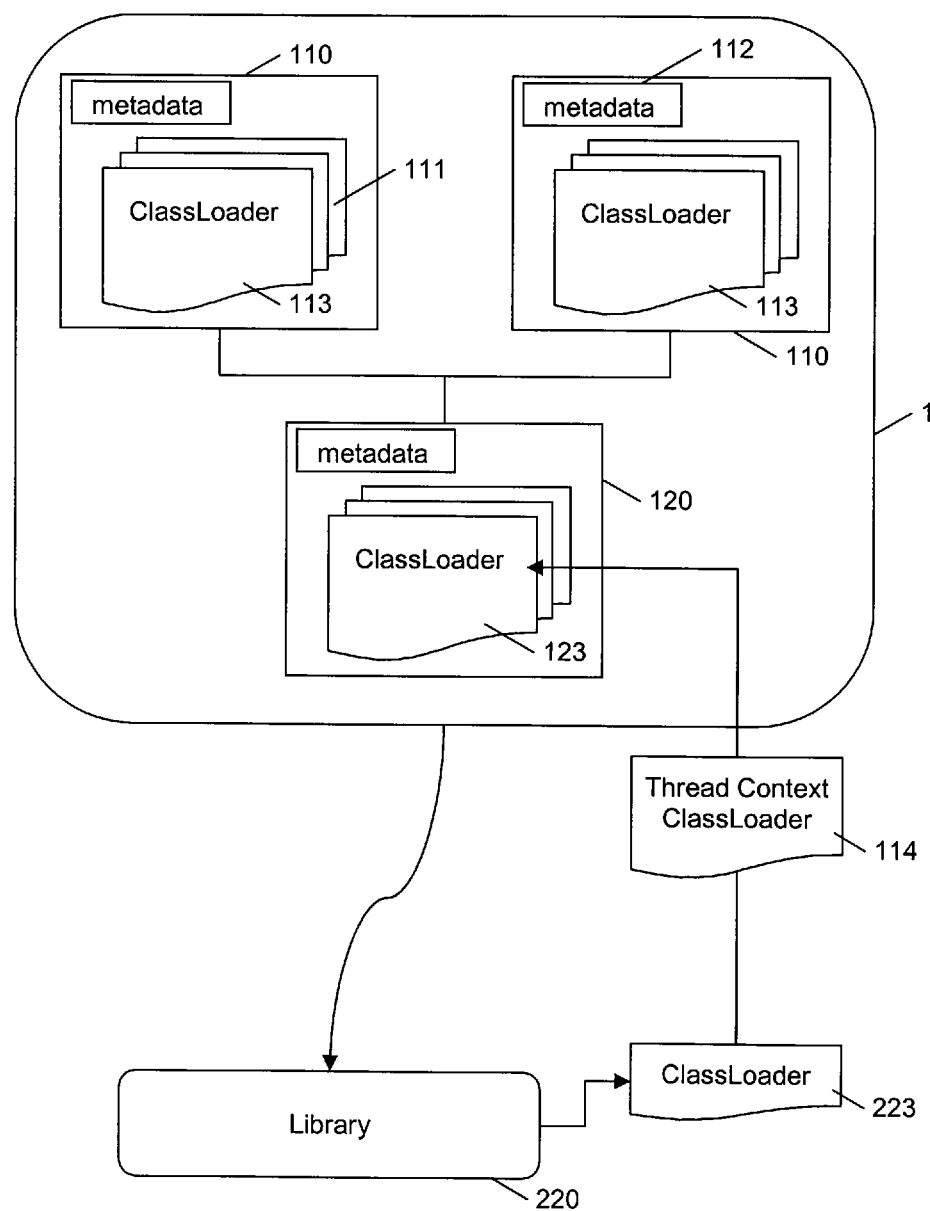
FIG. 7 is a schematic diagram showing selected parts of the exemplary host computer system when running an application program.

FIG. 7 is a schematic diagram showing selected parts of the host computer system when running the application program 1. The bundles 110 are each associated with a respective class loader 113. The synthetic bundle 120 likewise has an associated class loader 123 and a thread context class loader (TCCL) 114 is associated with the application program 1. Further, one or more libraries 220 are provided, which are also each associated with one or more respective class loaders 223.

A class loader is an object that is responsible for loading classes. Unlike applications written in statically compiled programming languages such as C and C++, dynamically compiled programming languages such as Java only link classes to libraries when those classes are loaded into the Java virtual machine dynamically at runtime. Classes are loaded into the Java virtual machine as they are needed. Further, when a loaded class depends on another class, then that class is also loaded.

Given the name of a class, a class loader tries to locate or generate data that constitutes a definition for the class. Typically, the class loader transforms the given class name into a file name and then reads a ".class" file of that name from a file system of the host computer. Class loaders use a delegation model to search for classes and resources. That is, each instance of class loader has an associated parent. When requested to find a class or resource, a class loader instance will delegate the search for the class or resource to its parent class loader before attempting to find the class or resource itself. The Java virtual machine's built-in class loader, called the "bootstrap class loader", does not itself have a parent but may serve as the parent of a class loader instance. Thus, the class loaders form a tree having the bootstrap class loader as the root node of the tree, and delegate class loading upwards toward the root node through successive ancestors according to the delegation model. Looking again briefly at FIG. 2, in the illustrated example the bundle management layer 231 typically forms a delegation graph relating to the OSGi class loaders 113 of the OSGi bundles 110.

Each application has one or more threads of execution in the Java virtual machine, and each thread is associated with a respective context class loader. Conveniently, this class loader is termed the thread context class loader (TCCL) 114. Usually the TCCL is capable of loading any of the classes in the application 1. By default, the TCCL is the class loader that loaded the application into the Java virtual machine. However, the TCCL can also be changed during runtime.

Typically, some of the classes 111 in the application 1 will reference the one or more libraries 220 provided in the runtime environment. A number of popular Java libraries need to load application classes even though the libraries are general purpose and do not have a dependency on any specific application. As an illustrative example, the Hibernate library is primarily used to map from Java classes to database tables (and from Java data types to SQL data types). In particular, Hibernate generates SQL calls to pass data into and out of database applications. The class loader 223 associated with the library 220 will in turn load classes to assist execution of the library.

Typically, a class loader calls a desired class using a method of the form "class.forName". The name of the class is given as a string argument. Thus, calling class.forName ("foox") will return the class object for the class named "foox". The method then attempts to locate, load, link, and optionally initialise, the named class.

The delegation model means that the class loader 223 associated with the library 220 will first attempt to delegate class loading to a parent class loader prior to attempting class loading itself. However, this can lead to unexpected errors.

In the runtime environment illustrated in FIG. 3, the class loader 223 of the library 220 delegates to the thread context class loader 114, either as its direct parent or indirectly through other intermediate generations of class loaders, according to the delegation model. Then, the thread context class loader 114 delegates to the class loader 123 of the synthetic bundle 120. The TCCL 114 does not delegate to any other bundle 110, i.e. any of the regular bundles 110, within the application program 1.

Application programs typically are assumed to exhibit modularity and thus only create dependencies which are explicitly intended by the application. However, the situation may arise wherein the dependency model delegates class loading from the class loader 223 of the library 220 back towards the application 1 through the TCCL 114, thus creating the potential for unintended dependencies where the application happens to contain a class having the sought-after class name. However, the synthetic bundle 120 now protects modularity of the application program, because the class load will fail unless the class has been explicitly exported by one of the regular application bundles 110 and hence imported into the synthetic bundle 120 to be exported from the application 1. The TCCL 114 delegates only to the class loader 123 of the synthetic bundle 120, and not to any other class loader 113 in the application 1, thus avoiding the creation of unexpected dependencies into the application program.

Figure 8:
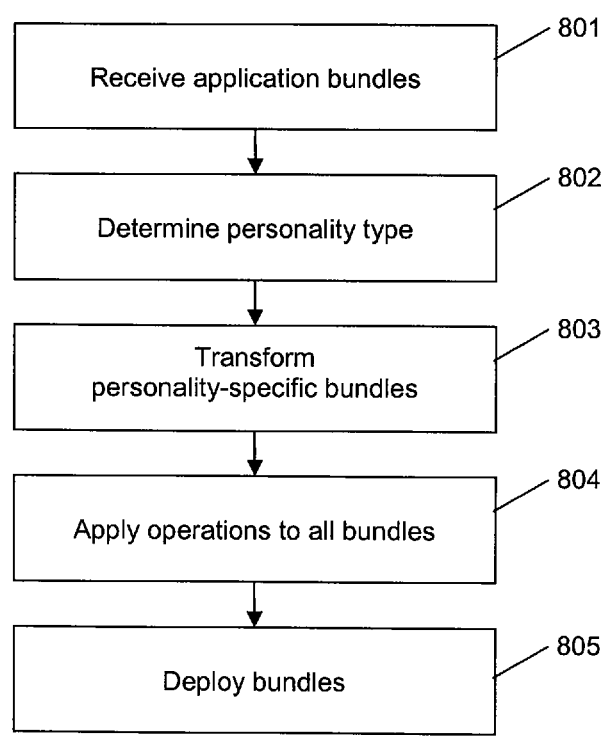
FIG. 8 is a flow diagram illustrating an example method of deploying an application program into a runtime environment of the host computer system.

FIG. 8 is a flow diagram illustrating an example method of deploying an application program into a runtime environment of the host computer system.

The application program 1 is received at step 801. Then, at step 802, it is determined whether or not each of the plurality of bundles of the application program is a personality-specific bundle having a specific personality type from amongst a predetermined set of personality types. At step 803, each of the determined personality-specific bundles is transformed by inserting additional dependencies into the metadata of the bundle according to the determined personality type.

At step 804, one or more operations are applied to all of the plurality of bundles. These operations may include a scoping operation and a synthetic bundle synthesis operation, which can be applied in any suitable order. Further, these operations may include an installing operation for installing each of the bundles ready for deployment, namely by installing each of the bundles with a bundle management layer 231 (e.g. an OSGi layer) and starting each of the bundles with that layer. At step 805, each of the installed personality-specific bundles is deployed into the application runtime environment 22 by a specific deployment process according to the personality of that bundle. Also, each of the bundles not having a specific personality type is deployed into the application runtime environment using a non-specific deployment process without any specific personality-based modifications.

In the further exemplary embodiments, the method may further include performing operations selectively on particular bundles of a specific personality type at runtime, and performing operations on all of the bundles regardless of their personality type or not. For example, the method may further include performing an undeploy step specific to each personality type further, the method may include performing an uninstall step of all of the bundles setwise without regard to specific personality type.

Similarly, the method may further include performing a specific stop (deactivate) or start (reactivate) step setwise regardless of personality type, or with respect to specific personality types.

Figure 9:
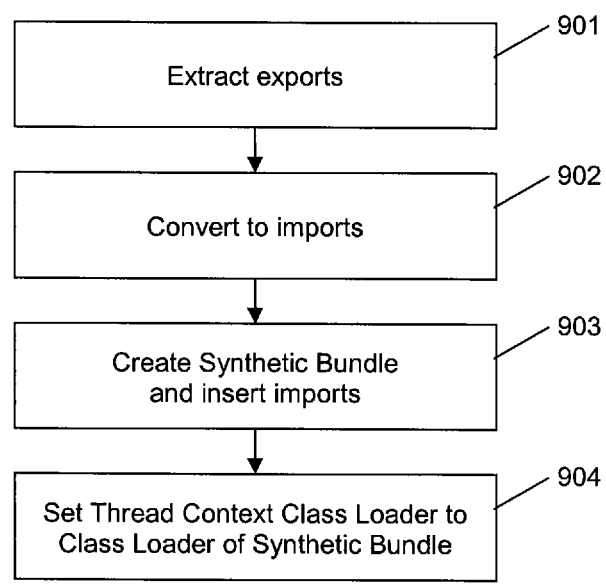
FIG. 9 is another flow diagram illustrating an example method of deploying an application program into a runtime environment of the host computer system.

FIG. 9 is a flow diagram illustrating further exemplary method steps for deploying the application program. In particular, FIG. 9 illustrates in detail the steps for producing the additional synthetic bundle 120.

At step 901, the metadata of each of the bundles 110 is examined and each of the export statements extracted from the metadata. At step 902, each of the export statements is converted into a corresponding import statement defining a respective exported class as an imported class, optionally including parameter transformation wherein parameters of the export statement are transformed into corresponding parameters of the import statement. At step 903, the additional synthetic bundle 120 is created comprising the manifest metadata and at least one class loader 123. Also, the import statements are inserted into the metadata of the synthetic bundle and the synthetic bundle 120 is added to the application program. At step 904, the thread context class loader of the runtime environment that is associated with a thread of the application program is set to delegate class loading to the class loader 123 of the synthetic bundle 120.

The deployment process discussed herein has many advantages. In particular, stability of the host computer system is improved and the host computer system is more reliable. As discussed above, bundles are identified as having a specific personality type such as a batch personality or a web personality. Then, those bundles are transformed according to their specific personality, such that the web type bundles have additional dependencies inserted relevant to their web personality and, similarly, batch type bundles have additional dependencies according to their batch personality. Further, the personality types are recognised when deploying the bundles. The web type bundles are deployed with reference to their web personality and the batch type bundles are deployed with reference to their batch personality. Thus, dependencies, such as package imports, may be inferred from personality-specific metadata which the application servers of the related art would normally only examine after the more general metadata had been processed. That is, existing application servers treat each kind of configuration metadata independently, so that application developers have to deal in separate web.xml files, Spring bean definitions, and so on. By contrast, the exemplary embodiments allow the developer system to supply less application metadata, because the necessary dependencies are instead identified and inserted automatically by the deployment system. Further, there are fewer opportunities for programming errors to arise on the development system, such as the specification of inconsistent metadata, because the necessary dependencies are instead inserted automatically into the metadata by the deployment system.

These and other advantages of the exemplary embodiments discussed herein will be appreciated by those skilled in the art from the discussion above, and from implementing the embodiments of the invention in practice.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:
1. A computer system, comprising:
a processor;
a memory comprising at least one computer-readable storage medium coupled to the processor;
a runtime environment arranged to support execution of an application program with respect to the memory and the processor, wherein the application program is divided into a plurality of bundles and wherein each of the bundles comprises metadata that includes a definition of zero or more dependencies related to the respective bundle; and
a deployment system arranged to deploy the application program into the runtime environment, the deployment system comprising a deployment management unit and one or more personality specific deployers, each personality specific deployer being separate from the deployment management unit and associated with a respective personality type;
wherein the deployment management unit comprises:
 a personality determining unit arranged to determine whether each bundle of the plurality of bundles is a personality-specific bundle having a personality selected from among a predetermined set of personality types, or else is a generic bundle not having a specific personality;
 an operator unit arranged to apply one or more operations to each of the plurality of bundles, including installing each of the bundles ready for deployment; and
 a generic deployment unit arranged to deploy each of the generic bundles installed by the operator unit into the runtime environment;
wherein the operator unit comprises
 a synthesiser unit comprising an extractor unit arranged to examine the metadata and extract export statements from the metadata,
 a converter unit arranged to convert each of the export statements into a corresponding import statement defining a respective exported package as an imported package, and
 a creator unit arranged to create an additional synthetic bundle comprising metadata and a class loader, insert the import statements into the metadata of the synthetic bundle, and add the synthetic bundle to the application;
wherein
 the synthesiser unit is arranged to set a thread context class loader associated with the application in the runtime environment to delegate class loading to the class loader of the synthetic bundle, and
 the class loader of the synthetic bundle is arranged to load each of the exported packages of the plurality of bundles as the imported packages from the synthetic bundle; and
wherein each of the one or more personality specific deployers comprises:

a personality specific transformer unit arranged to transform each of the personality-specific bundles having a same personality type as the personality specific deployer by identifying one or more additional dependencies, not included in the metadata of the personality-specific bundle, that are associated with the personality type of the personality-specific bundle, and inserting the one or more additional dependencies into the metadata of the personality-specific bundle; and a personality specific deployment unit arranged to deploy each of the personality-specific bundles having the same personality type as the personality specific deployer installed by the operator unit into the runtime environment.

2. The computer system of claim 1, wherein
the operator unit is arranged to apply the one or more operations to each of the plurality of bundles in a like manner, including both the personality-specific bundles having a specific personality type and the generic bundles not having a specific personality type; and
the personality specific transformer unit is arranged to transform only the personality-specific bundles having a same personality type as the personality specific transformer unit.

3. The computer system of claim 1, wherein the operator unit is arranged to apply the one or more operations to the plurality of bundles to act upon both the metadata which was originally received in the bundles and also on the additional dependencies which were inserted into the metadata by the personality specific deployers.

4. The computer system of claim 1, wherein each of the personality types relates to a predetermined programming model.

5. The computer system of claim 1, wherein the set of personality types include at least a web personality type, and wherein the transformer unit related to the web personality type is arranged to add the additional dependencies to import one or more web-specific packages including one or more servlet interface packages.

6. The computer system of claim 1, wherein the set of personality types include at least a batch personality type and wherein the transformer unit related to the batch personality type is arranged to add the additional dependencies to import one or more batch-specific packages.

7. The computer system of claim 1, wherein the personality determining unit is arranged to query each of the one or more personality specific deployers to determine which of the personality specific deployers is adapted to process a particular candidate bundle from the application.

8. The computer system of claim 7, wherein at least one of the personality specific deployers is arranged to determine whether or not it is adapted to process the candidate bundle by analyzing a physical structure of the bundle.

9. The computer system of claim 7, wherein one or more of the bundles comprises an explicit metadata flag denoting the personality type of that bundle and at least one of the personality specific deployers is arranged to determine whether or not it is adapted to process the candidate bundle by examining the explicit metadata flag.

10. The computer system of claim 1, wherein the runtime environment further comprises a bundle management layer and the operator unit is arranged to install each of bundles with respect to the bundle management layer, including satisfying the additional dependencies created in the metadata by the personality specific deployers.

11. The computer system of claim 1, wherein the operator unit further comprises a scoping unit arranged to scope the metadata of each of the bundles to produce a set of bundles which are unique to the application.

12. A method of deploying an application program into an application runtime environment of a computer system, the method comprising the computer-implemented steps of:
receiving the application program divided into a plurality of bundles, each bundle comprising metadata relating to zero or more dependencies of the bundle;
determining whether or not each of the plurality of bundles is a personality-specific bundle having a specific personality type from amongst a predetermined set of personality types;
transforming each of the personality-specific bundles by identifying one or more additional dependencies, not included in the metadata of the personality-specific bundle, that are associated with the personality type of the personality-specific bundle and inserting the additional dependencies into the metadata of the personality-specific bundle;
applying one or more operations to all of the plurality of bundles including:
installing each of the plurality of bundles ready for deployment;
deploying each of the installed personality-specific bundles into the application runtime environment using a respective personality specific deployer that corresponds to the respective personality of the personality-specific bundles; and
deploying each of the remaining bundles not having a specific personality type into the application runtime environment using a generic deployer, wherein each personality specific deployer is separate from the generic deployer;
extracting export statements from the metadata of each of the plurality of bundles;
converting each of the export statements into a corresponding import statement;
creating an additional synthetic bundle comprising metadata and a class loader, inserting the import statements into the metadata of the synthetic bundle and adding the synthetic bundle to the application program; and
setting a thread context class loader of the runtime environment associated with a thread of the application program to delegate class loading to the class loader of the synthetic bundle.

13. A non-transitory computer-readable storage medium having recorded thereon instructions to form a deployment system which when implemented by a computer system deploys an application program into a runtime environment of the computer system, wherein the application program is divided into a plurality of bundles, each bundle comprising metadata relating to zero or more dependencies of the bundle, the medium comprising:
instructions operable to determine whether or not each of the plurality of bundles is a personality-specific bundle having a specific personality type from amongst a predetermined set of personality types;
instructions operable to transform each of the personality-specific bundles identifying one or more additional dependencies, not included in the metadata of the personality-specific bundle, that are associated with the personality type of the personality-specific bundle and inserting the additional dependencies into the metadata of the personality-specific bundle;

instructions operable to apply one or more operations to all of the plurality of bundles, including installing each of the bundles ready for deployment;

for each personality-specific bundle, instructions configured according to a respective personality of the personality-specific bundle to deploy the personality-specific bundle into the runtime environment; and instructions, separate from instructions configured according to a respective personality of the personality-specific bundle, operable to deploy bundles that do not have a specific personality;

instructions operable to extract export statements from the metadata of each of the plurality of bundles;

instructions operable to convert each of the export statements into a corresponding import statement;

instructions operable to create an additional synthetic bundle comprising metadata and a class loader, insert the import statements into the metadata of the synthetic bundle and add the synthetic bundle to the application program; and instructions operable to set a thread context class loader of the runtime environment associated with a thread of the application program to delegate class loading to the class loader of the synthetic bundle.

14. A non-transitory computer-readable storage medium having recorded thereon instructions to form an application program executable in a runtime environment of a computer system, the medium comprising:

instructions operable to provide a plurality of bundles comprising metadata including export statements defining exported packages, wherein metadata of at least one of the bundles includes an explicit metadata flag denoting a personality type of that bundle;

instructions operable to provide an additional synthetic bundle comprising metadata and a class loader, wherein the metadata of the synthetic bundle comprises import statements corresponding to each of the export statements in the metadata of the plurality of bundles; and instructions operable to set a thread context class loader of the runtime environment associated with a thread of the application program to delegate class loading to the class loader of the synthetic bundle.

15. A method of forming an application program executable in a runtime environment of a computer system, the method comprising the computer-implemented steps of:

providing a plurality of bundles comprising metadata including export statements defining exported packages, wherein metadata of at least one of the bundles includes an explicit metadata flag denoting a personality type of that bundle;

providing an additional synthetic bundle comprising metadata and a class loader, wherein the metadata of the synthetic bundle comprises import statements corresponding to each of the export statements in the metadata of the plurality of bundles; and setting a thread context class loader of the runtime environment associated with a thread of the application program to delegate class loading to the class loader of the synthetic bundle.

* * * * *